United States Patent Office 3,152,100
Patented Oct. 6, 1964

3,152,100
RUBBERY COPOLYMER OF N-VINYL-3-MOR-PHOLINONE AND MONOVINYL ETHER OF DIETHYLENE GLYCOL AND VULCANIZATES THEREOF
George B. Sterling and Robert L. Zimmerman, Midland, Mich., assignors to The Dow Chemical Company, Midland, Mich., a corporation of Delaware
No Drawing. Filed Dec. 27, 1960, Ser. No. 78,288
13 Claims. (Cl. 260—41)

This invention relates to compositions of matter comprising rubbery copolymers and vulcanizates thereof. More particularly, this invention is concerned with copolymers of monovinyl ethers of glycols with certain N-vinyl-3-morpholinones and to vulcanized compositions made from such copolymers.

It is known that rubbery copolymers can be made by the copolymerization of various monomers such as styrene with butadiene, acrylonitrile with butadiene, and isobutylene with butene. As the search continues for monomers and combinations of monomers which will produce rubbery material when subjected to polymerization, it has been found that many monomers produce inflexible resinous or fibrous products and that elastomeric materials are difficult to produce. In addition, known rubbery polymers contain residual unsaturation to which is attributed their susceptibility to oxidative attack.

It is among the objects of the present invention to provide new rubber compositions of matter. A further object of the present invention is the provision of vulcanized products suitable for use in place of vulcanized natural rubber. Another object of the present invention is the provision of novel reinforced elastomeric compositions. A further object of the present invention is to produce elastomeric compositions which are free of residual unsaturation. These and other objects are attained in accordance with the practice of the present invention as will appear from the following description.

It has now been discovered, and the discovery forms the basis of the invention, that elastomeric compositions are produced by reacting the monovinyl ether of a glycol with certain N-vinyl-3-morpholinones. The resulting rubbery copolymers can be compounded with reinforcing agents and cured to produce vulcanized rubbers of superior quality.

The monovinyl ethers suitable for the production of copolymers and vulcanizates of the present invention are the monovinyl ethers of glycols and are represented by the general formula HO—($C_nH_{2n}O$—)$_x$CH=CH$_2$ in which $n$ is a poistive integer from 2 to 4 and in which $x$ is a positive integer from 1 to 3. Representative examples of such compounds are the monovinyl ether of ethylene glycol, the monovinyl ether of trimethylene glycol, the monovinyl ether of propylene glycol, the monovinyl ethers of the butylene glycols, the monovinyl ether of diethylene glycol, the monovinyl ether of tripropylene glycol and the monovinyl ether of dibutylene glycol.

The monomers copolymerizable with the monovinyl ethers to prepare the elastomers of the present invention are certain N-vinyl-3-morpholinones corresponding to the general formula

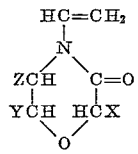

wherein X, Y and Z are independently selected from the group consisting of hydrogen and alkyl radicals containing from 1 to about 4 carbon atoms. Representative examples of such monomers are N-vinyl-3-morpholinone, N-vinyl-2-methyl-3-morpholinone, N-vinyl-2-ethyl-3-morpholinone, N-vinyl-5-methyl-3-morpholinone, and N-vinyl-6-ethyl-3-morpholinone. These and related compounds are known to the art and can be made according to the method described in U.S. patent application Serial No. 692,587, filed October 28, 1957.

The new copolymers can be produced by emulsion, mass or solution polymerization or by any of the other usual polymerization techniques. Advantageously the copolymers of the present invention are produced by reacting the comonomeric materials in a confined zone in the presence of suitable polymerization catalysts such as free radical catalysts. The materials are preferably agitated slowly and maintained at elevated temperatures during the polymerization reaction.

It is found that rubbery polymers can be produced which contain in polymerized form between about 40 percent and about 90 percent by weight of the monovinyl ether and between about 10 percent and about 60 percent by weight of N-vinyl-3-morpholinone and the alkyl derivatives hereinabove referred to. Good elastomeric materials are provided by polymers containing in the polymer molecule between about 60 percent and about 80 percent by weight of the monovinyl ether and between about 20 percent and about 40 percent by weight of the morpholinone compounds.

The copolymers of the present invention are vulcanized by compounding the copolymers with vulcanizing agents and subjecting the compounded materials to curing conditions. For example, the crude rubbery material is compounded with vulcanizing agents such as sulfur, sulfur chloride and aniline butyraldehyde. When the crude rubbery material is to be converted into vulcanized products, it is highly desirable that the crude material be compounded with a reinforcing filler since it is found that such fillers substantially increase the tensile strength and improve other physical properties of the vulcanizate. Representative examples of reinforcing fillers are the various carbon blacks including lamp black, channel black, furnace black and the like, zinc oxide and kaolin. It is desirable to include an accelerator in the compounding in order to reduce the amount of time necessary to carry out the vulcanization. Representative examples of accelerators suitable for use in producing the vulcanizates of the present invention are benzothiazolyl disulfide, 2 - mercaptobenzothiazole, 1,3 - diphenylguanidine, and zinc dimethyldithiocarbamate. Advantageously, the crude rubber is also compounded with an activator to initiate the vulcanization reaction. Among the activators suitable for use with the herein described copolymers to produce the vulcanized products of the present invention are stearic acid, zinc oxide, lead oxide and magnesium oxide.

The compounding of the crude rubber can be done by malaxing, kneading, milling or otherwise intimately blending the crude rubber of this invention with the compounding ingredients in the desired proportions as by compounding the materials with one another in an internal mixer such as a plastics extruder or a Banbury mixer or on an external mixer such as an open-faced roll mill to form a homogeneous composition.

The following example is illustrative of the present invention but the invention is not limited to the specific details thereof. All parts and percentages are parts and percentages by weight unless otherwise specified.

*Example 1*

There are placed in a 12-ounce citrate bottle, 80 grams of the monovinyl ether of diethylene glycol, 20 grams of N-vinyl-3-morpholinone, 0.5 gram of lauroyl peroxide and 0.5 gram of α,α'-azobis(isobutyronitrile), the latter two materials acting as polymerization catalysts. The bottle is then flushed with nitrogen, capped and clamped into a tumbler-type washing machine. The machine is operated at 40 rotations per minute and kept at a temperature of 60° C. for 30 hours. The bottle is removed from the machine and broken to obtain the contents which is a gel of polymer and monomer. The polymer is devolatilized by heating for 10 hours at a temperature of 100° C. and at an absolute pressure of 10 mm. of mercury. There is obtained 90 grams of crude rubbery copolymer containing in polymerized form 32 percent of N-vinyl-3-morpholinone and 68 percent of the monovinyl ether of diethylene glycol.

*Example IA*

One hundred parts of the crude rubbery copolymer is fed onto a cold two-roll mill. There are then compounded with the polymer on the mill for 15 minutes 40 parts of furnace black, 5 parts of zinc oxide, 5 parts of sulfur and 3 parts of benzothiazolyl disulfide, an accelerator. The homogeneous mixture is then placed in a mold and cured at a temperature of 145° C. for 50 minutes under a pressure of 1000 p.s.i. The cured product when tested in the manner described in A.S.T.M. D412–51T exhibits an elongation of 800 percent, a tensile strength of 326 pounds per square inch, and a permanent set of zero. When tested in accordance with A.S.T.M. D676–55T the material is found to possess a Shore A hardness of 53 and a Shore C hardness of 23.

*Example IB*

One hundred parts of the crude rubbery copolymer produced according to Example I is supplied to a cold two-roll mill. There are then compounded with the polymer on the mill 40 parts of furnace black, 5 parts of litharge, 2 parts of aniline butyraldehyde and 1 part of stearic acid. The compounding takes about 15 minutes. The intimate mixture thus produced is cured in a mold for 50 minutes at a temperature of 145° C. and at a pressure of 1000 pounds per square inch. This product exhibits when tested in accordance with the procedure set out in A.S.T.M. D412–51T, a tensile strength of 24.2 pounds per square inch, an elongation of 550 percent and a permanent set of 100 percent. The Shore A hardness and Shore C hardness obtained in the manner described in A.S.T.M. D676–55T are found to be 15 and 5, respectively.

In a manner similar to the foregoing examples each of the monovinyl ethers within the class above defined and mixtures thereof are copolymerizable with each of the N-vinyl-3-morpholinones within the class above defined and mixtures thereof to produce rubbery copolymers which can be compounded with reinforcing fillers and cured to produce vulcanizates having properties similar to those obtained above.

The new compositions possess good processability and can be compounded in accordance with standard formulations and according to standard techniques. The compounding can include materials in addition to those given above, such as peptizers, plasticizers, softeners, retarders, antioxidants, extenders, and coloring materials as well as various factices, natural, synthetic and reclaimed rubbers. The compositions are useful for making a variety of rubber articles including sheets, films, gaskets, electrical insulation and the like, by well known techniques such as molding, calendering, extruding and the like.

As will be appreciated, various modifications can be made within the scope of the present invention without departing from the spirit thereof.

That which is claimed is:

1. A composition of matter comprising a vinyl addition copolymer of free-radical polymerization containing in polymerized form from about 40 precent to about 90 percent by weight of a monovinyl ether represented by the general formula $HO-(C_nH_{2n}O-)_xCH=CH_2$ in which $n$ is a positive integer from 2 to 4 and in which $x$ is a positive integer from 1 to 3, and from about 10 percent to about 60 percent by weight of a comonomer corresponding to the general formula

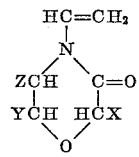

wherein X, Y and Z are independently selected from the group consisting of hydrogen and alkyl radicals containing from 1 to about 4 carbon atoms.

2. A composition of matter according to claim 1 in which the monovinyl ether is the monovinyl ether of diethylene glycol.

A. A composition of matter according to claim 1 in which the comonomer is N-vinyl-3-morpholinone.

4. A composition of matter according to claim 3 in which the monovinyl ether is the monovinyl ether of diethylene glycol.

5. A composition of matter comprising a vinyl addition copolymer of free-radical polymerization containing in polymerized form from about 60 percent to about 80 percent by weight of a monovinyl ether represented by the general formula $HO-(C_nH_{2n}O-)_xCH=CH_2$ in which $n$ is a positive integer from 2 to 4 and in which $x$ is a positive integer from 1 to 3, and from about 20 percent to about 40 percent by weight of a comonomer corresponding to the general formula

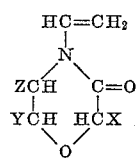

wherein X, Y and Z are independently selected from the group consisting of hydrogen and alkyl radicals containing from 1 to about 4 carbon atoms.

6. A composition of matter according to claim 5 in which the monovinyl ether is the monovinyl ether of diethylene glycol.

7. A composition of matter according to claim 5 in which the comonomer is N-vinyl-3-morpholinone.

8. A composition of matter according to claim 7 in which the monovinyl ether is the monovinyl ether of diethylene glycol.

9. A vulcanized synthetic rubber made by compounding together a copolymer of a monovinyl ether represented by the general formula $HO-(C_nH_{2n}O-)_xCH=CH_2$ in which $n$ is a positive integer from 2 to 4 and in which $x$ is a positive integer from 1 to 3, and a comonomer corresponding to the general formula

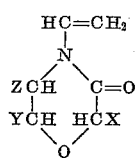

wherein X, Y and Z are independently selected from the group consisting of hydrogen and alkyl radicals containing from 1 to about 4 carbon atoms, there being present in the copolymer in polymerized form about 40 percent to about 90 percent by weight of the monovinyl ether and about 10 percent to about 60 percent by weight of the comonomer, rubber-vulcanizing agents, and a reinforcing filler, and heating the resulting composition at curing temperature until the composition is substantially vulcanized.

10. A vulcanized synthetic rubber according to claim 9 in which the monovinyl ether is the monovinyl ether of diethylene glycol.

11. A vulcanized synthetic rubber according to claim 9 in which the comonomer is N-vinyl-3-morpholinone.

12. A vulcanized synthetic rubber according to claim 9 in which the reinforcing filler is carbon black.

13. A vulcanized synthetic rubber made by compounding together a copolymer of the monovinyl ether of diethylene glycol and N-vinyl-3-morpholinone, there being present in the copoylmer in polymerized form about 60 percent to about 80 percent by weight of the monovinyl ether and about 20 percent to about 40 percent by weight of N-vinyl-3-morpholinone rubber-vulcanizing agents, and carbon black, and heating the resulting composition at curing temperature until the composition is substantially vulcanized.

References Cited in the file of this patent

UNITED STATES PATENTS

| | | |
|---|---|---|
| 2,429,587 | Schildknecht | Oct. 21, 1947 |
| 2,692,256 | Bauer et al. | Oct. 19, 1954 |
| 2,828,220 | McWherter et al. | Mar. 25, 1958 |
| 2,952,668 | Ehlers | Sept. 13, 1960 |

FOREIGN PATENTS

| | | |
|---|---|---|
| 378,544 | Great Britain | Aug. 18, 1932 |
| 441,064 | Great Britain | Jan. 9, 1936 |